April 20, 1937. L. S. WAIT 2,077,538
EXHAUST GAS ANALYZER FOR AUTOMOTIVE VEHICLES
Filed June 8, 1935
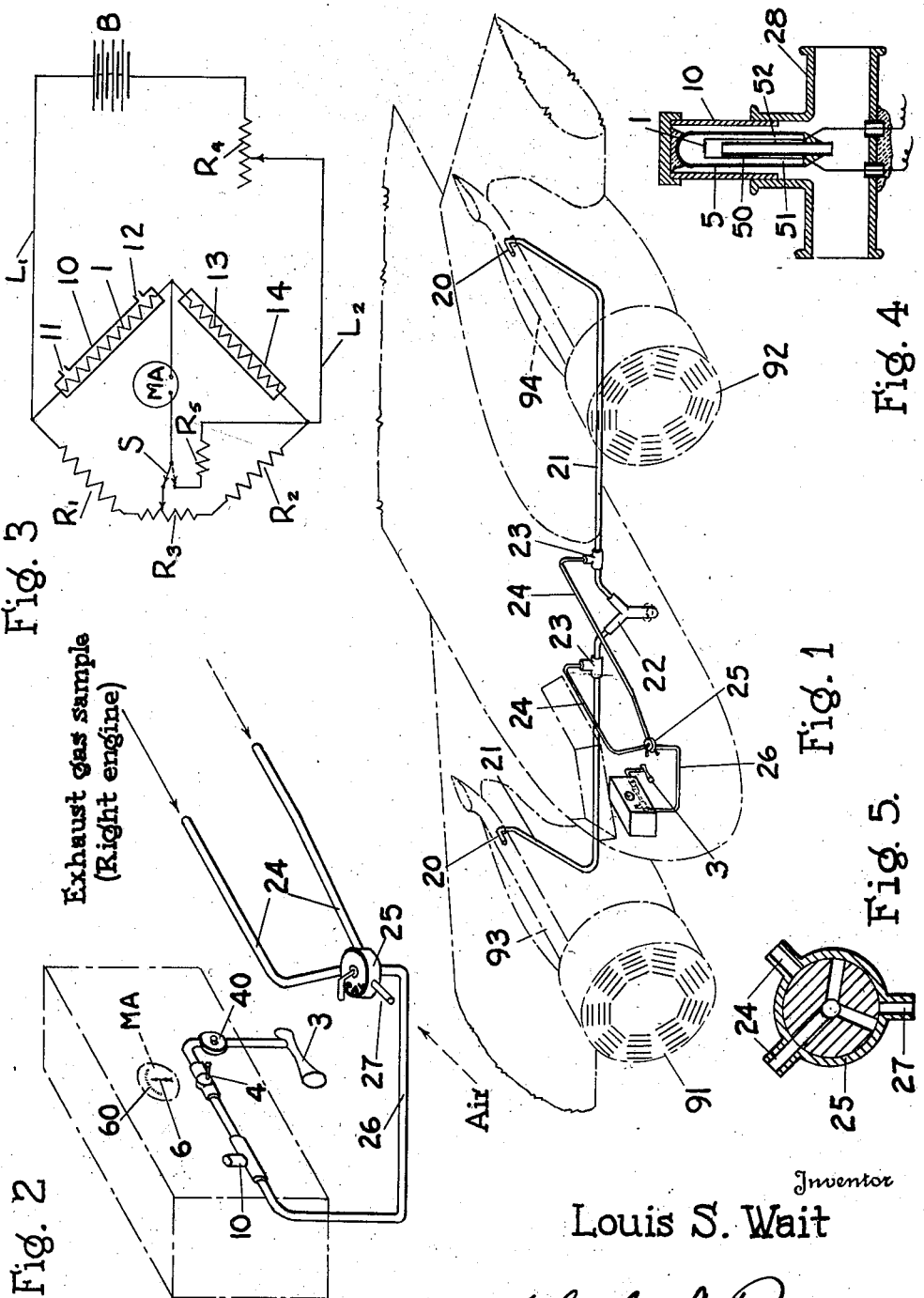
Inventor
Louis S. Wait
By Charles L. Reynolds
Attorney Patented Apr. 20, 1937

2,077,538

UNITED STATES PATENT OFFICE 2,077,538

EXHAUST GAS ANALYZER FOR AUTOMOTIVE VEHICLES

Louis S. Wait, Seattle, Wash., assignor to Boeing Aircraft Company, Seattle, Wash., a corporation of Washington Application June 8, 1935, Serial No. 25,692

14 Claims. (Cl. 73—51)

My invention relates to internal combustion engines, and more particularly to a means for quickly, accurately, and repeatedly analyzing the composition of the exhaust gas from such an engine, thereby to determine the air-fuel ratio supplied to the engine. While not limited to such use, my invention is particularly intended for installation upon vehicles powered by combustion engines, for example, airplanes and automobiles.

Economy of operation is an important consideration to the owner of an automobile or to the pilot of an airplane. It becomes increasingly important to the operator of a fleet of automobiles or trucks, or to the transport airplane operator operating a number of airplanes. Furthermore, since fuel capacity is limited in airplanes, owing to the necessity of carrying the maximum of useful load, economy of operation affects the range of such an airplane, and in military operations the range of operation is of great importance. An airplane may, for example, be sent out on a long range mission, calculated upon the normal fuel consumption, and is expected to perform its mission and return. If, however, because of poor economy of operation the fuel supply is exhausted before the airplane can reach its return destination, it must land and in all probability is lost. In transport flying, if a pilot calculates his fuel consumption on a basis which, by reason of poor economy in the engines, does not correspond to the actual consumption, he may unexpectedly run out of fuel, with the result that he is forced to land immediately.

Such discrepancies between the calculated fuel consumption and the actual fuel consumption have been found in actual operations to vary widely. The actual fuel consumption may, for example, be 25% to 30% more than the calculated or theoretical fuel consumption, and such variations do not affect the power developed by the engine nor the R. P. M. rate sufficiently to be noticeable.

Furthermore, in airplane operation, the air-fuel ratio is subject to variation from time to time during a given flight, for example, by change of altitude, by reason of adjustment by the pilot for climbing or for gliding, and like considerations.

The normal method of adjustment for economy with adequate power in an airplane, while in flight, is to lean down the mixture until the R. P. M. rate falls off, then to enrich the mixture until the R. P. M. rate increases and sufficient power is delivered and the motor sounds right. Different pilots may have different ideas concerning or different reactions to such changes, and one pilot may achieve maximum economy where another will not. Experience has shown that the R. P. M. rate increases rapidly from an air-fuel ratio of about 8 to 1 up to a ratio of 9 or 9.5 to 1, but from that point on through to about 13.5 to 1 there is, practically speaking, no variation in the R. P. M. rate, nor consequently in the power delivered. Beyond about 13.5 to 1 the R. P. M. rate again decreases as a theoretically perfect combustion mixture is approached. It is therefore essential for economy that the air-fuel ratio be maintained under all conditions (and as I have pointed out, these conditions vary constantly) at about 13.5 to 1. Any larger air-fuel ratio will not deliver sufficient power. Any lower air-fuel ratio will result in waste.

Devices have been available for testing engines by sampling the exhaust gases therefrom, thus to determine the air-fuel ratio for which they are set, but all such devices, so far as I am aware, have been in the nature of laboratory instruments, able to test an engine while at rest, but not adapted to installation in a motor vehicle, and particularly not adapted to operation upon an airplane in flight. Such prior devices were not adaptable to use upon moving vehicles, particularly airplanes, not merely because they were of delicate construction, but because they were not adaptable to function under varying conditions of exhaust gas pressure, of differing atmospheric pressure, and were not provided with effective means for eliminating from samples the water, carbon and similar entrained matter in the exhaust gases which were likely to foul the analyzer, and therefore made it unsuitable for long continued operation. Furthermore, the filter means employed, if such means were used at all, for entrapping the water, carbon and like extraneous matter was not adaptable to conditions of flying, especially where the plane must assume different attitudes of flight, perhaps even inverted positions at times. Furthermore, such a filter is not effective to remove moisture under freezing conditions such as are often encountered in flight, but will clog with ice.

Having the above considerations in mind, it is a primary object of my invention to provide a device whereby the air-fuel ratio supplied to the engine or engines of a motor vehicle, particularly an airplane, may be tested and determined from time to time while the vehicle is in operation. Another object is to provide such a device, adaptable to installation upon a moving vehicle, which will not be subject to variation because of variations in the engine's exhaust pressure, but which is capable of functioning independently of the engine's exhaust pressure. Reliability of operation is assured by positively removing all moisture and foreign matter from the samples of exhaust gas tested.

It is a further object to provide such a device which may be sufficiently rugged and reliable that it can be installed and used for long periods on motor vehicles, and which when used upon an airplane will not be injured nor rendered inaccurate by reason of the varying conditions, vibration, etc. to which it is subjected.

A further object is to provide such a device which is simple in construction, and which may be arranged to take advantage of the movement of the vehicle to accomplish certain of its functions, and which may be comparatively inexpensive, and sufficiently light for airplane installation. Such a device will operate accurately and without appreciable delay, although the engine is a considerable distance away from the indicating mechanism, as is common in modern airplanes.

Other objects, more particularly those which relate to the mechanical details of my invention, will be ascertained as this specification progresses.

My invention comprises the novel system, as shown in the accompanying drawing, described in this specification, and more particularly defined by the claims which terminate the same.

In the accompanying drawing I have diagrammatically illustrated an installation of my invention upon a dual-motored airplane, it being obvious how it might be employed with a single-motored or multi-motored plane, or upon any other automotive vehicle powered with an internal combustion engine.

Figure 1 is a diagrammatic view in perspective of the system as installed upon a dual-motored plane, the airplane and engines being shown in dot and dash lines to bring out more clearly the analyzer system.

Figure 2 is a similar view, to a larger scale, showing the indicating and controlling part of the system.

Figure 3 is an electrical diagram of the indicating part of the system.

Figure 4 is an axial sectional view through one of the resistance elements employed.

Figure 5 is a section through a typical selector valve.

It is known that the resistance of an electrical resistance element varies in accordance with the heat dissipating quality of a surrounding atmosphere, particularly if that atmosphere be moving at a rate sufficient to remove the dissipated heat by convection. It is known also that the heat dissipating quality of an atmosphere varies with the composition of that atmosphere. This knowledge is employed in existing exhaust gas analyzers to construct an indicator in the form of a Wheatstone bridge, one resistance element forming one side of the bridge and another reference resistance element forming the other side of the bridge. The reference resistance element is enveloped in a reference atmosphere, for example air, and the other resistance element is surrounded by exhaust gases, and the exhaust gases are conducted past this resistance element. At a given air-fuel ratio the exhaust gases will contain a given percentage of nitrogen and carbon dioxide (containing, of course, other gases, but principally these two), and this composition will affect the resistance element in a way which will enable an indicator connected in the Wheatstone bridge to come to rest at a given point in a scale. Variations in the composition of the exhaust gas will then effect a variation in the indication of the indicator, which can be calibrated to read directly in air-fuel ratios.

I may employ the same indicating arrangement, or any other in which the variation in the resistance of a resistance element is accomplished by reason of a variation in the composition of the surrounding atmosphere. Thus in Figure 3 is shown a resistance element 1 surrounded by an envelope 10 having ports 11 and 12 at opposite ends, one of which may be an inlet and the other a discharge port, thus permitting gases to pass through the envelope and over the resistance element 1. A second or reference resistance element 13 is also shown, which in this instance is sealed within an envelope 14 containing air. The elements 1 and 13 constitute the opposite sides of a Wheatstone bridge in a circuit including the lines L1, L2, the battery B (a few dry cells will suffice), and resistances R1, R2 and R3 and R5. Another variable resistance R4 may be incorporated in one of the lines, as L2. An indicator MA is connected in the circuit through a switch S, so that it may at will by-pass the resistance 13 or balance the two resistances 1 and 13 against each other through the variable resistance R3. The indicator MA is preferably a microammeter, for such instruments are readily available and sufficiently rugged to stand up under airplane service.

In the airplane installation illustrated in Figures 1 and 2 a sample of exhaust gas is led from one or the other of the engines 91 or 92 to the envelope 10, which contains the resistance element 1, by a suitable conduit or series of conduits, and on past the resistance element for discharge to the atmosphere. The details of the conduit may be varied widely, as also may be the details of the bleeder or sampling means. I have shown an elbow 20 disposed in each of the exhaust stacks 93 and 94 of the right and left hand engines, respectively, each elbow facing in a direction to receive a sample of the exhaust gases passing through the stack. Obviously the sample may be taken at any point between the cylinders and the outlet of the exhaust stack. It should be so arranged, however, as to receive a minimum of water, carbon, and other matter entrained in the exhaust, and to that end the Pitot tube 20 should be at least one-fourth of the stack diameter above the lowest point in the stack. From this elbow a transition pipe 21 extends towards the envelope 10, and may continue uninterruptedly past the resistance element 1 therein, but preferably the pipe 21 extends through a Y 22, each conduit 21 being connected thereto, to discharge to the atmosphere, the end of the Y projecting beneath the skin of the airplane and being inclined downwardly rearwardly, or otherwise arranged, to produce an aspirating effect, drawing the gases therethrough as the airplane is in motion. This produces a positive suction through the conduits 21, inducing a flow of exhaust gas therethrough at high velocity.

At an intermediate point may be arranged a T-fitting 23, preferably adjacent the Y 22, to which is connected a second sampling conduit 24. Preferably the T 23 leads upwardly into a downwardly directed leg of the conduit 24, which is of smaller cross sectional area than the conduit 21, and this, coupled with the positive suction past the discharge end of the Y 22, causes water, water vapor, and carbon and like entrained matter to pass, by reason of its considerable momentum, directly out of the discharge end of the Y, and the sample entering the conduit 24 is free from such matter, as otherwise it might give an incorrect reading. Furthermore, this arrangement to eliminate water, carbon, and the like by positive exhaustion is free from any difficulty or failure of operation, even when the plane assumes an attitude which is not horizontal, as when banking steeply.

The conduits 24 may be joined to a selector valve 25, whereby either of the conduits 24 may be connected to a conduit 26, but not both at one time (see Figure 5), or the conduit 26 may be connected with an air intake 27 when the instrument is not in use, thereby continually blowing out the passages which include the resistance element 1. The conduit 26 includes a fitting 28 in which the resistance element 1 is supported, and thence leads to a source of negative pressure or vacuum. Any suitable source of vacuum may be employed, as a vacuum pump, the intake manifold of the engine, or a venturi. The venturi 3 has been shown as typical of any suitable vacuum source by means of which a positive vacuum may be impressed upon the conduit system, of a strength which is in excess of the maximum exhaust pressure passing through the conduit system, and which is preferably a multiple a number of times in excess of this exhaust pressure.

Between the location of the resistance element 1 and the vacuum source 3 I prefer to provide means for controlling the amount of vacuum and the rate of flow through the conduit system and past the resistance element. For example, a cock 4 may be employed, interposed in the conduit 26, by which the effective area of the conduit may be controlled, and therefore the rate of flow therethrough, and at 40 may be provided a relief or bypass valve which is arranged to maintain a given vacuum at the outlet of the cock 4.

The particular construction of the resistance element and the style of its mounting are not in themselves a part of my invention. This is illustrated, however, in Figure 4. The resistance element is supported and enclosed in a housing 10, which is supported as an extension of the fitting 28, and within this housing is a glass envelope 5 sealed at its lower end to a glass tube 50. The tube 50 is open at its lower end to the gases passing through the fitting 28, and by the passage of these gases past this open end of the tube 50 they are drawn into the upper end of the tube, where they circulate slowly around the tiny resistance element 1, supported upon lead-in wires 51 and 52, and are drawn out again at the lower end of the tube by the entrance of fresh gas, and thus there is a slow but continuous circulation of exhaust gas samples around the resistance element 1.

Whenever it is desired to test an engine, for example the right hand engine 91, the two sides of the Wheatstone bridge are first balanced one against the other at a balance point upon the scale, as indicated by the indicator finger 6 forming part of the microammeter. The envelope 10 is at such time in communication with air entering through the air intake 27, the valve 25 and conduit 26. The switch S is then thrown to the dotted line position of Figure 3, unbalancing the Wheatstone bridge and proving that the device is operating properly. The switch is then returned to the full line position of Figure 3, in balance, and the valve 25 is turned to connect the conduit 24 from the engine 91 through the valve 25 with the conduit 26, and at the same time to cut off communication of the air intake 27 and the other conduit 24 with the conduit 26. Exhaust gas samples are now drawn through the conduit 24 from the conduit 21 of the right hand engine and delivered through the conduit 26 past the fitting 28 and consequently past the resistance element 1. The composition of these gases affects the resistance of the element 1, and unless their composition has heat dissipating qualities identical with air, will unbalance the Wheatstone bridge, effecting a movement of the indicator finger 6 without delay, and the scale 60 with which it cooperates may be calibrated to indicate the air-fuel ratio in figures. The valve 4 should be regulated so that the movement through the conduit 26 and past the resistance element 1 is a slow but steady movement, and so that the vacuum applied to the conduit 26 is a comparatively high vacuum of the nature of about two and one-half inches of mercury. This corresponds to a pressure many times greater than the exhaust pressure of the engine or the exhaust pressure passing through the conduit 26, and consequently, when the exhaust pressure is dropped, due to idling of the motor or reduction of the R. P. M. rate, the flow through the conduit 26 is substantially unchanged. In an installation which has been made, the exhaust pressure is five inches of water, and the vacuum pressure is thirty-four inches of water. If the exhaust pressure should fall away to one inch of water, the pressure differential will change from thirty-nine to thirty-five inches or will decrease 10%. Without the vacuum controlled outlet at cock 4 a pressure drop from five to one inch of water would give a differential change of 80%. Whereas the 80% change in pressure would have a detrimental effect on the rate of flow, and consequently on the accuracy and reliability of the indicator, the 10% change will not affect to an appreciable extent the rate of movement of the gas past the protected resistance element 1. In consequence its indication is not effected by speed of movement of the gas, which remains substantially constant, but entirely by the heat dissipating qualities of the gas, which in turn is a function of the particular composition of the gas.

Such a test may be made with little or no delay. The apparatus is tested and balanced prior to each test and therefore is accurate in accordance with the conditions then prevailing, which may have changed since the preceding test, and each engine can be tested in turn, and can be adjusted with the sampling system in operation, and the system will follow the adjustment with but slight delay, until the air-fuel ratio is set for the conditions then prevailing to give the maximum of economy with adequate power.

What I claim as my invention is:

1. In an automotive vehicle, in combination with an exhaust gas stack leading from the vehicle's engine, a sampling conduit disposed in said stack to intercept samples of the gases passing therethrough, for discharge to the atmosphere, a resistance element, the resistance of which is variable in accordance with change in the composition of a surrounding atmosphere, disposed in said sampling conduit, means to indicate such variations, and means projecting into the air stream of said vehicle and connected to said sampling conduit, beyond the resistance element from the exhaust stack, to maintain a suction in such conduit while the vehicle is in motion, and other suction-producing means interposed in said conduit between the exhaust stack and the resistance element, and similarly projecting into the air stream, to maintain a suction in such portion of the conduit, and to discharge the water, carbon, and a part of the exhaust gases to the atmosphere before they can reach the resistance element.

2. An exhaust gas analyzer for use with a combustion engine, comprising analyzing mechanism, a sampling conduit leading therethrough and arranged and disposed to intercept a sample of exhaust gas emitted from the engine, suction means connected to said conduit at the discharge side of said analyzing mechanism, and a valve disposed between said analyzing mechanism and said suction means operable to maintain a substantially uniform pressure in said conduit at the analyzing mechanism irrespective of fluctuations in the engine's exhaust pressure or the suction created by said suction means.

3. An exhaust gas analyzer for use with a combustion engine, comprising analyzing mechanism, a sampling conduit leading therethrough and arranged and disposed to intercept a sample of exhaust gas emitted from the engine, suction means connected to said conduit at the discharge side of said analyzing mechanism, and a by-pass valve disposed between said analyzing mechanism and said suction means to compensate for the variation in suction created by said suction means and fluctuations in the engine's exhaust gas pressure, to maintain constant the suction effect on the exhaust gases flowing past the resistance element.

4. An exhaust gas analyzer for use with a combustion engine, comprising a resistance element the resistance of which is variable in accordance with change in the composition of the exhaust gas, a conduit communicating with the engine exhaust to lead an exhaust gas sample to and past said resistance element, suction means at the discharge side of said resistance element to draw gas past the element, and further suction means interposed in said conduit between the engine exhaust and said resistance element to positively withdraw from the exhaust gas sample and said conduit impurities therein.

5. An exhaust gas analyzer for use with a combustion engine of an automotive vehicle, comprising a resistance element the resistance of which is variable in accordance with change in the composition of a surrounding atmosphere, a conduit communicating with the engine exhaust to lead an exhaust gas sample to and past said resistance element, suction means at the discharge side of said resistance element to draw gas past the element, and means connected to said conduit between the engine and said resistance element and projecting into the air stream of said vehicle to create a suction by passage of air thereover, to positively withdraw from the exhaust gas sample and said conduit impurities therein and to discharge them to the atmosphere.

6. In an automotive vehicle, in combination with an exhaust stack leading from the vehicle's engine, analyzing mechanism, a sampling conduit extending therethrough and communicating with said stack to bleed therefrom samples of the exhaust gas flowing therethrough, means connected to said sampling conduit at the discharge side of said analyzing mechanism, to maintain a suction in such conduit, and other suction-producing means interposed in said conduit between the exhaust stack and said analyzing mechanism, and projecting into the air stream of said vehicle to maintain a suction in such portion of the conduit, while the vehicle is in motion, and to withdraw from the sampling conduit and to discharge to the atmosphere the water, carbon, and a part of the exhaust gases bled from said stack before they reach said analyzing mechanism.

7. In an automotive vehicle, in combination with an exhaust stack leading from the vehicle's engine, a conduit communicating with said stack, means connected to said conduit, and projecting into the air stream of said vehicle to create a suction in such conduit by passage of air over said means, analyzing mechanism, a sampling conduit, including a portion extending upwardly from said first conduit, and a second portion extending from said first portion downwardly, connecting said first conduit to and extending through said analyzing mechanism, and suction means connected to said sampling conduit on the discharge side of said analyzing mechanism, to bleed an exhaust gas sample from said first conduit and to draw it through said sampling conduit and analyzing mechanism.

8. In an automotive vehicle, in combination with an exhaust gas stack leading from the vehicle's engine, analyzing mechanism, a sampling conduit leading from said stack to and through said analyzing mechanism, means connected to said conduit and projecting into the air stream of said vehicle to create a suction in such conduit by passage of air over said means, and means automatically operable to maintain a substantially uniform pressure in and flow through said sampling conduit irrespective of variations in the suction created by said first means as the speed of flow of the air stream thereover varies.

9. An exhaust gas analyzer for use with a combustion engine of an automotive vehicle, comprising analyzing mechanism, a sampling conduit extending therethrough and arranged and disposed to intercept a sample of exhaust gas emitted from the engine, means connected to said conduit and projecting into the air stream of said vehicle to create a suction in such conduit by passage of air over said means, a relief valve automatically operable to maintain a substantially uniform pressure in said sampling conduit irrespective of variations in the suction created by said first means as the speed of flow of the air stream thereover varies, and regulating means disposed in said conduit, operable to vary the amount of exhaust gas drawn through said conduit under the influence of the uniformly sustained vacuum.

10. In an automotive vehicle, in combination with an exhaust gas stack leading from the vehicle's engine, analyzing mechanism, a sampling conduit extending therethrough, means connected to said sampling conduit and disposed in the exhaust gas stack for subjection to the impact pressure of the exhaust gas flowing therethrough, means on the outlet side of said analyzing mechanism connected to said conduit and projecting into the air stream of said vehicle to create a suction in such conduit by passage of air over such means, and governing means in said conduit operable to maintain a substantially uniform pressure in and flow through said sampling conduit irrespective of variations in suction created by said second means as the speed of the air stream varies, or fluctuations in the exhaust gas impact pressure on said first means induced by changes in engine speed.

11. An exhaust gas analyzer for use with a combustion engine of an automotive vehicle and the exhaust stack thereof, comprising, a transition conduit, means connected to one end of said transition conduit and disposed in the exhaust stack for subjection to the impact pressure of the exhaust gas flowing therethrough, means connected to the other end of said transition conduit and projecting into the air stream of said vehicle to create a suction in such conduit by passage of air over such means, analyzing mechanism, a sampling conduit passing therethrough, and having one end connected to said transition conduit between its ends, and means connected to the other end of said sampling conduit, and likewise projecting into the air stream, to create a suction in said sampling conduit by passage of air over such means, thus to bleed an exhaust gas sample from said transition conduit and to draw it through said analyzing mechanism.

12. An exhaust gas analyzer for use with a plurality of combustion engines, comprising analyzing mechanism, a sampling conduit leading through said analyzing mechanism, bleeding conduits, one extending from each of the engines to said sampling conduit, an air conduit, and means selectively operable at will to establish communication between any one of said bleeding conduits and said sampling conduit, but mandatorily operable to establish communication between said air conduit and said sampling conduit before establishing communication between any other bleeding conduit and said sampling conduit.

13. An exhaust gas analyzer, comprising analyzing mechanism, a sampling system including an initial bleeder conduit discharging to the atmosphere, and connected to a preceding exhaust gas conduit to bleed therefrom a part only of its flow of exhaust gases, and a final bleeder conduit passing through said analyzing mechanism and discharging to the atmosphere, and connected to the first bleeder conduit between its ends, to bleed therefrom a part only of its flow of exhaust gas, and suction means at the discharge end of each bleeder conduit to draw therethrough the gases bled from the preceding conduit.

14. An exhaust gas analyzer, comprising a plurality of bleeder conduits each discharging to the atmosphere, and arranged in series relation, the first of which is connected to a preceding exhaust gas conduit between the latter's ends, to bleed therefrom a part only of its flow of exhaust gas, and the last of which is similarly connected between the ends of the preceding one, suction means at the discharge end of each bleeder conduit to draw therethrough the gases bled from the preceding conduit, and analyzing mechanism, the last bleeder conduit passing through said analyzing mechanism.

LOUIS S. WAIT.